Sheet 1_4 Sheets.
M. T. Rowland.
Tailors Measure.
N° 10779.                    Patented Apr. 18, 1854
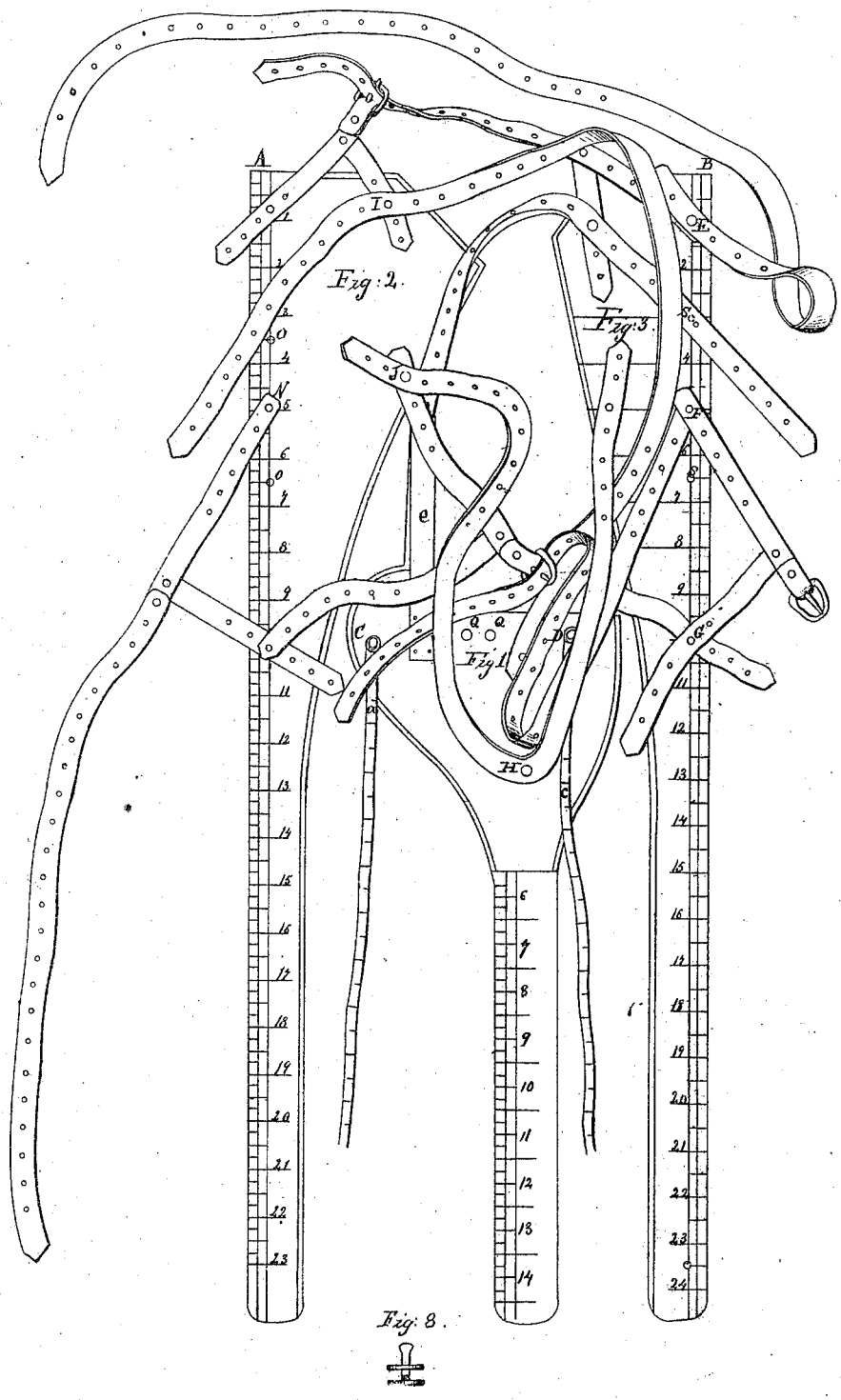

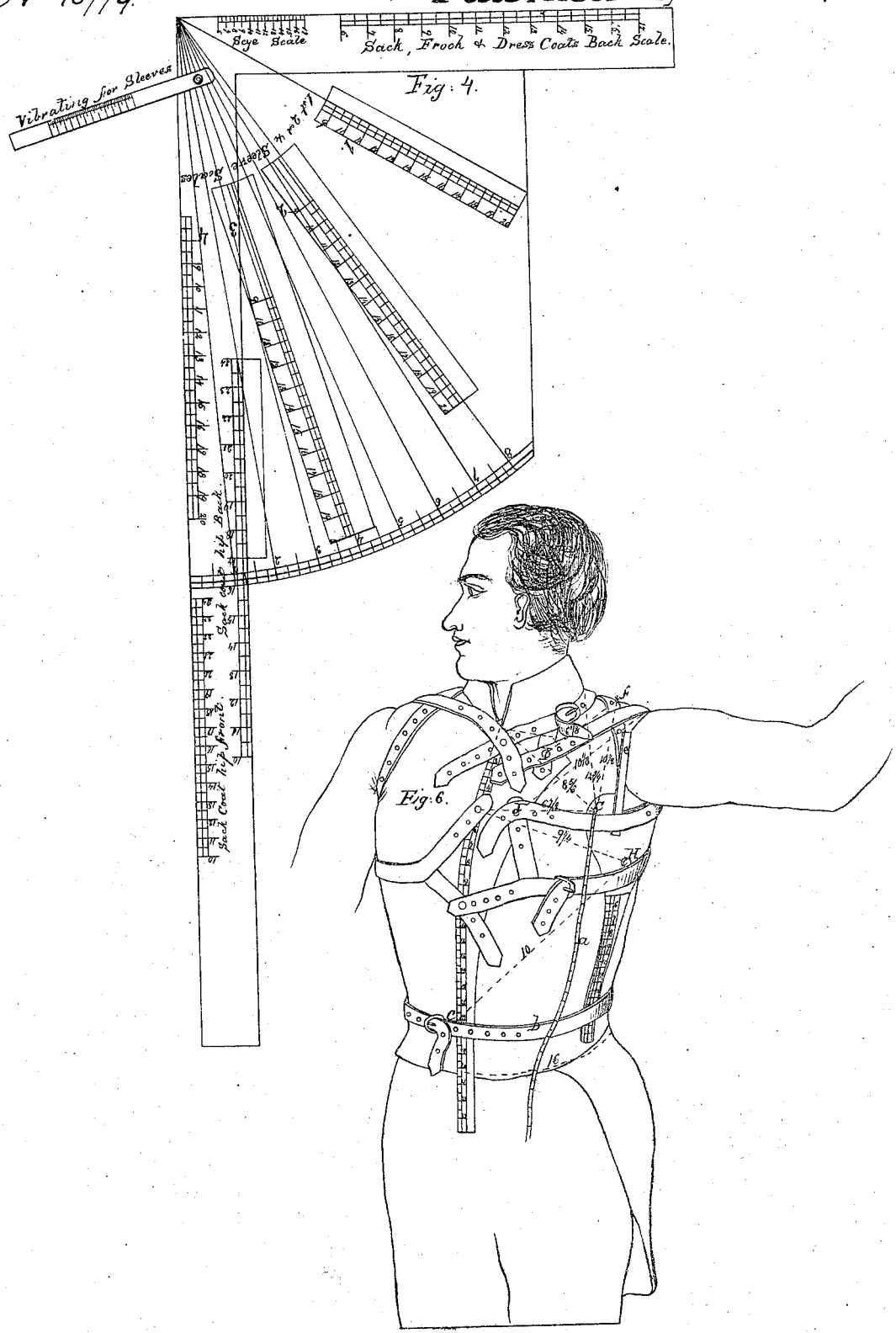

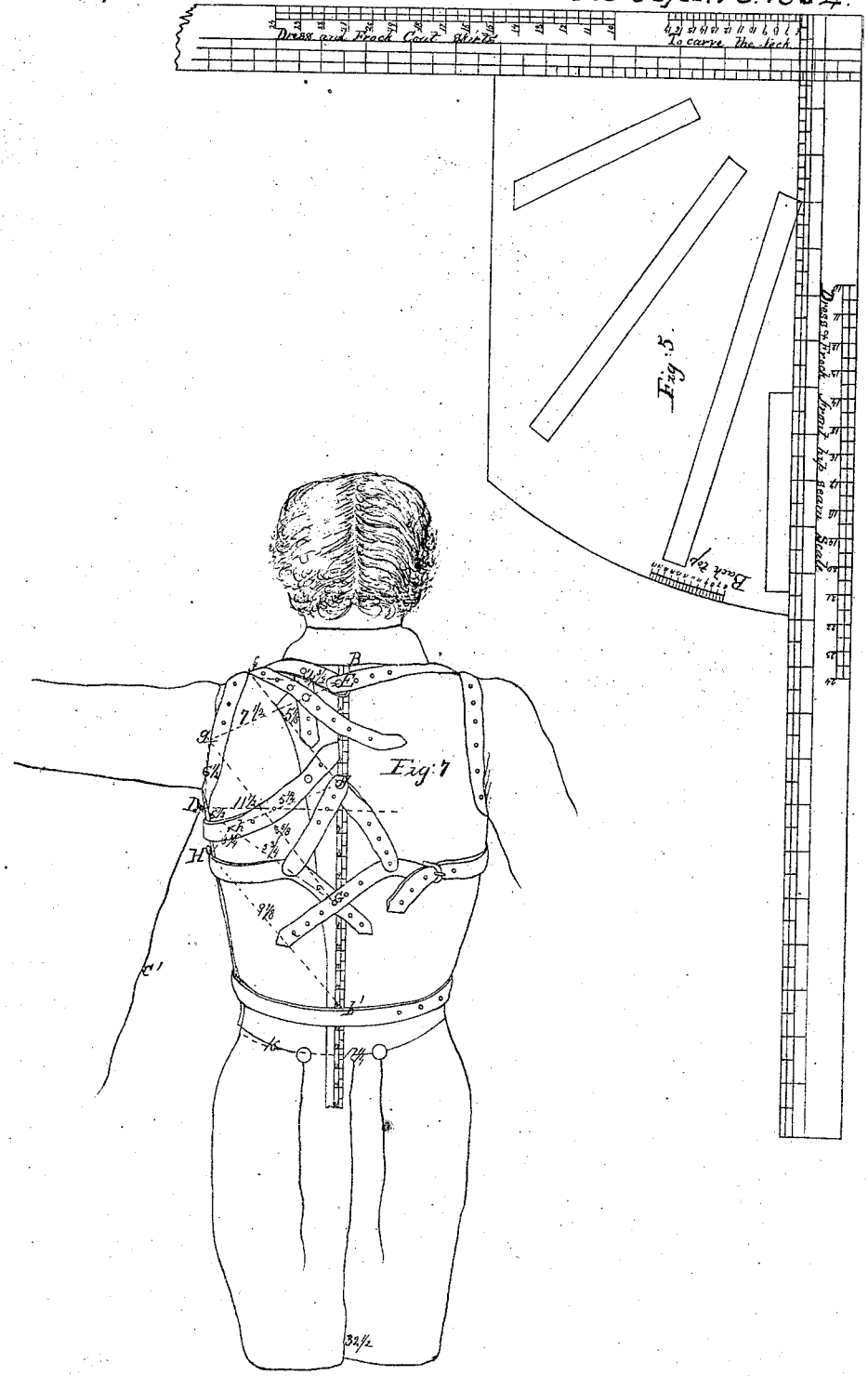

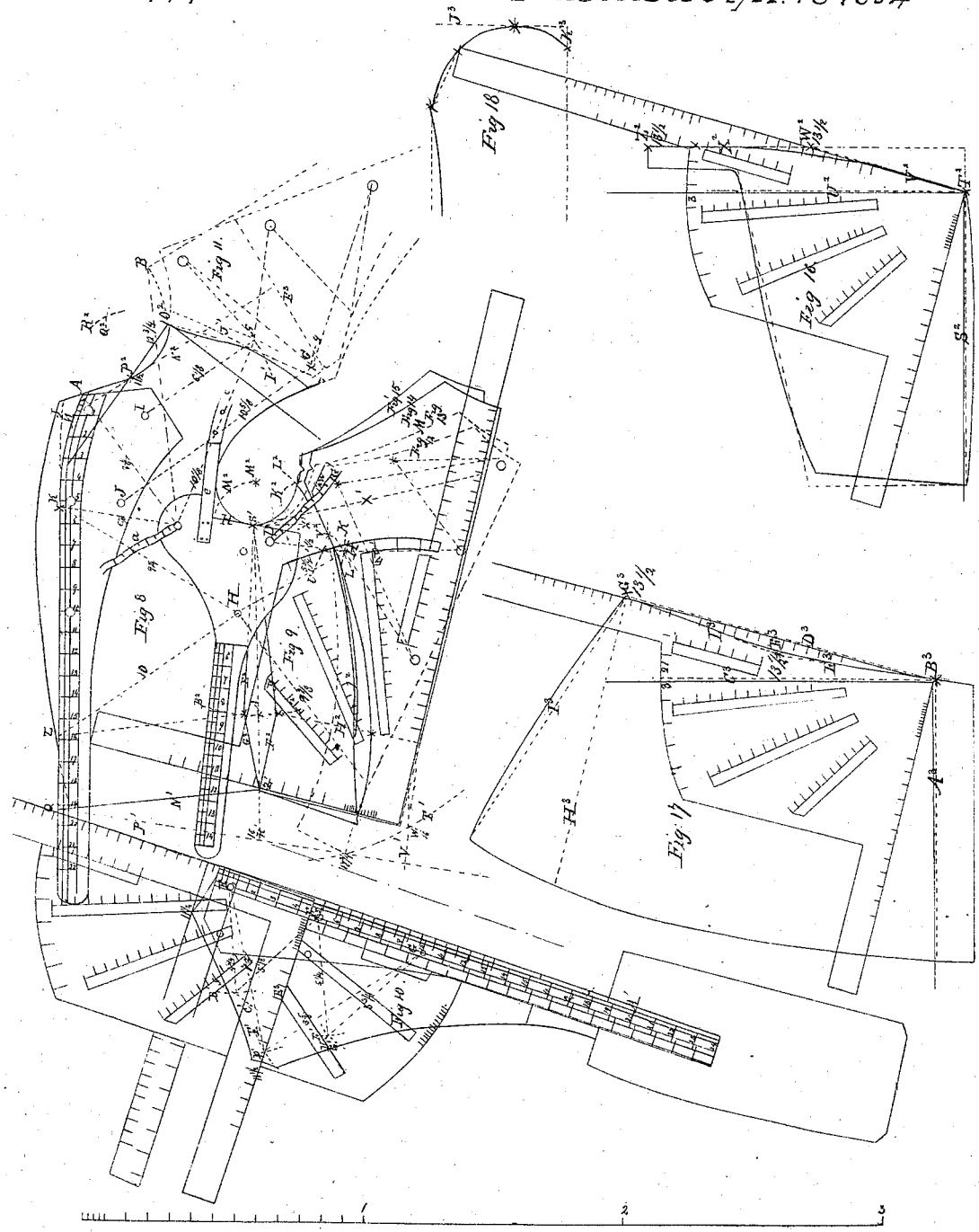

UNITED STATES PATENT OFFICE.

MOSSES T. ROWLANDS, OF PITTSTON FERRY, PENNSYLVANIA.

TAILOR'S MEASURE.

Specification of Letters Patent No. 10,779, dated April 18, 1854.

*To all whom it may concern:*

Be it known that I, MOSSES T. ROWLANDS, of Pittston Ferry, in the county of Luzerne and State of Pennsylvania, have invented a new and useful apparatus for taking measures and cutting garments for persons of either sex in connection with a triangular system of admeasurement called the "trigonometrical measures" or "tailor's trigonometrical measurer;" and I do hereby declare that the same is described and represented in the following specification and drawings.

The nature of my invention consists in securing several scales to the body of the person to be measured with fixed points and pivots in the scales which points and pivots form the points of imaginary base lines, from which a series of triangulations are taken which determine the dimensions of the body with the greatest accuracy; so as to insure the garments to fit perfectly upon deformed as well as upon the most perfectly formed persons. After the measure is taken the scales are removed from the body and applied to the cloth so as to repeat the triangulations taken upon the body, upon the cloth, where, with the aid of a square and sector containing a series of scales adapted to the several parts of the garment to be cut, it is marked out with mathematical certainty so that it may be made up at once thereby saving the trouble, delay and expense of basting the garment and trying it on the person practiced by tailors who use the old systems of measuring and cutting.

To enable others skilled in the art to make and use my invention I will proceed to describe its construction and the mode of using it, referring to the accompanying drawings in which the same letters indicate like parts in all the figures.

Figure 1 is the side scale; Fig. 2, the front and Fig. 3 the back, being all represented with the proper straps attached to them to fasten them upon the body of the person whose measure is to be taken. Fig. 4 represents one side of the square and sector and Fig. 5 the opposite side. Figs. 6 and 7 represent the body of a person with the apparatus fastened upon it so as to take his measure. Fig. 8 is a diagram of the fore part of a coat; Fig. 9, the side piece; Fig. 10, the back; Figs. 11, 12, 13, 14 and 15, the back in several of the different positions in which it is used to cut the other two parts; Fig. 16, the skirt of a dress coat and 17, the skirt of a frock coat.

The scales represented in the three first figures may be made of leather paper, or such other material as may be convenient; and a scale of inches and parts of an inch marked upon them, and studs fastened in them to which the straps are hitched to fasten them upon the body, also the tapes used in taking the measure. The straps to fasten the scales upon the body may be made of leather or other material and constructed as represented or of such form as will answer the purpose with series of holes so as to hitch them upon the studs in different positions; also with buckles to adjust them to the dimensions of different persons; or instead of the buckles a portion of some of the straps may be made of india rubber so they will answer for different dimensions. The side scale, Fig. 1, has a metal plate $e$ fastened to it which is placed against the front of the arm when the top of the scale is placed under it, the arm being raised to a horizontal position. I make a square and sector of wood, metal, paper, or other material of the form represented in the drawing and twice the size (the five first figures in the drawing being drawn 6 in. to a foot) and mark the several scales upon one side as represented in Fig. 4, and the scales as shown in Fig. 5, upon the opposite side; also attach a vibrating scale for the sleeves as represented in the drawing so as to swing round upon the side or a groove may be made for it in the edge of the square.

The pivots one of which is represented at Fig. 18 are fastened in with a nut and screw, and there are holes in the scales so as to change the studs as follows N to O, O; D to QQ; F to SS as represented in the drawing.

Directions to put the scales represented in the three first figures upon the person whose measure is to be taken: Take off the cravat and button the coat tight around the body; mark the height for the top of the back nearly over the socket bone; also the exact hollow of the waist and length of back for hip buttons, then place the apparatus upon the body as represented in Figs. 6 and 7, having first adjusted the pivots that are movable according to your judgment so as to adapt it to the size of the person to be measured. Put the corner A of the front scale higher or lower in the center under the chin according to style with the edge perpendicular down the front. Adjust the top of the side scale close up under the arm when it is in a horizontal position with the plate *e* against the front of the arm and the scale parallel to the front scale or perpendicular. Now put the corner B of the back scale to the place marked over the socket bone with the edge of the scale perpendicular down the center of the back. Now proceed to take his measure by beginning in front at A, and drawing the permanent tape measure *a* fastened on C horizontally across his breast and note the distance above it on the front scale from A 5 inches; then note the distance on the same scale where the strap *b* crosses it at *c* 17 inches, (the strap *b* surrounding the body at its smallest circumference.) I then note the distance on the back scale from B to the strap *b* which is 15½ inches (*b'*) and on the same scale the back tack or hip buttons, 17¼, also for the bottom of the skirts 32½. Then with the permanent tape *c'* fastened on D drawn horizontally across the back blade bone I note the distance on the said tape 11½ inches which is reckoned from the perpendicular *e* of the scye square. I now make a star (★ *f*) on the shoulder seam half way between the collar and sleeve, and another star (★ *g*) on the scye seam opposite the center of the arm when it is raised to a horizontal position, and another star (★ *h*) on the back side seam in the center of the round of the blade bone. I now hitch a tape on the pivot E and note the distance to the star *f* 4¾ in. then change the tape to the pivot F and note the distance to star ★ *f* 5⅛ in. then to E again and note the distance to ★ *g* 7½ in., and change the tape to G and note to ★ *g* 8⅝ in. and move it to F and note to ★ *h* 5¼ in. then move to G and note to ★ *h* 5¾ in. The directions measured to the stars are shown in dotted lines on the drawing with the distances measured marked upon them in Fig. 7. I now proceed to take the front measures Fig. 6, by hitching the tape on the pivot H and note the distance from H to the intersection of the front scale and strap *b* (marked *c*) 10 in.; which point *c* is 17 in. on the front scale. Then note the distance from H to the 5 in. mark upon the front scale 9¼ in. the distance on the tape *a* to same mark on front scale 6⅞ in. then with same tape to point at 8⅝ in. And then proceed to take the shoulder measures with the tape *a* to star ★ *f* (see Fig. 7) 10¼ in. then hitch a tape to pivot I and note the distance to the same star ★ *f* 6⅛ in. Then with tape *a* to point B on the back 12¾ in. Then with the tape hitched on pivot J note the distance to star ★ *g* (back scye) 10⅛ in. Then on back with *c'* note the distance to star ★ *h* 6½ in. then with a tape on H the distance to same ★ *h* 5¾ then from same pivot H note the distance to 15½ or *b'* on the back scale 9⅞ in. Then with tape *c'* to ★ *g* on back scye 6½. I then note the distance from 17 in. *c* on the front scale around the hip to 17¼ on the back scale to back tack 16 in. and then take the measures for the sleeves in the usual manner to suit the prevailing fashion or otherwise.

*An abstract of the above measures.*—Lengths, front, 5—17; lengths, back, 15½—17¼—32½; blade bone measure, 11½; back triangles, 4¾—5⅛—7½—8⅝—5¼—5¾; front triangles, 10—9¼—6⅛—8⅝; shoulder triangles, 10¼—6⅛—12¾—10⅛; side back triangles, 6½—5¾—9⅞—6½; hip measure, 16; sleeve measure (as taken with the above) 20½—31¼—14¼—12½—11½—10.

*Directions to cut the back,* (Fig. 10.)—Rule line A' and lay back scale parallel to it allowing for top and back seam; hitch tape on pivot E and draw arc B' with 4¾ in. Then with tape on F with 5⅛ in. draw arc C'; then from E with 7½ in. draw arc D'; then from pivot G with 8⅝ in. draw arc E'; and on F with 5¼ in. draw arc F'; then on G with 5¾ draw arc G'. Now remove the back scale, and lay the square Fig. 4, parallel to A' with the long arm toward the neck and so that the short arm will cross the intersection of D' and E' make a mark on the cloth at 11½ on back scale of square allowing for seams and draw line E³ across the back. Then lay the inside of the long arm of the square Fig. 5, parallel to A' so as to mark the width of back at top 11½ from back top scale. Then mark your shoulder seam, back scye seam, and back side seam according to taste or fashion also the back skirt according to measure. Then take the front scale Fig. 2, and lay it on the cloth in the most advantageous position and draw a line J by the front and top edge and make ★ ★ K and L opposite 5 and 15 on the scale for length measures. Now put on the side scale Fig. 1, in such a position that the pivot H will be 9¼ in. from the 5 or ★ K and 10 in. from the 15 or ★ L last named; hold the pivot H firm and vibrate the scale with tape *a* until 6⅞ reaches to the above mentioned 5 in. or ★ K on the front scale. Now rule a line by the top H' and also by the perpendicular *e;* hold the 5 in. mark on front scale in its place at ★ K and vibrate the top toward the side scale until the corner A is opposite 8⅝ on the tape *a*, and mark from A to K line M.

*Shoulder triangles.*—With the tape on I 6⅛ in. mark arc I'; then with a 10¼ in. arc J'. Now take the back already cut and put a pin through the intersection of B' and C' or star ★ *f* and stick it into the intersection of I' and J'; vibrate the back so that the corner B will stand at 12¾ on *a*. Then rule the shoulder seam by the back from B to a point opposite the pin; then vibrate the back so that star ★ $g$ will be $10\frac{5}{8}$ in. from pivot J and rule by the back from opposite the pin by shoulder seam and back scye.

*Side-back triangle.*—With tape $c'$ $6\frac{1}{2}$ draw arc K'; then from pivot H with $5\frac{3}{4}$ draw arc L'. Now put a pin through ★ $h$ on the back and stick it into the intersection of K' and L' and vibrate the back so that $15\frac{1}{2}$ in. on back seam or scale will be $9\frac{7}{8}$ in, from pivot H; then rule by the back shoulder, back scye, and back side seams. Now vibrate the back until ★ $g$ is opposite $6\frac{1}{2}$ on $c'$; then rule by the back from opposite pin around to the top (see M'); then put the long arm of the square to the back seam with the corner as the back tack; then make a mark on the back at O' opposite 4 on the circular scale hold the corner of the square to its place and vibrate the long arm to the point O' and rule the line P' by the short arm and make ★ Q' where it intersects the front perpendicular.

*Hip measure.*—Place corner of square on star Q' with the long arm below the line P' and make star ★ R' opposite 16 on dress and frock front, hip seam scale. Now place the square so as to measure from the intersection of perpendicular $e$ on H' with scye scale and mark a ★ S' opposite $11\frac{1}{2}$ and rule a line from S' to R'. Now with S' for a center and with the distance from S' to $18\frac{3}{4}$ on the back seam or tack draw arc T'; now with 16 in. from ★ Q' draw arc V' to intersect T' at star ★ W' (16 in. is half the hip circumference) draw front hip line from Z' to the corner on line P' as represented. Then with the distance from S' to the edge of the back opposite ★ $h$ mark curve U'; now put the long arm of the square on the line R', S' with the corner at S' the back lying in its proper position under the square and rule the line X' by the short arm of the square. Then make a star ★ Y' on the edge of the back where is crosses the arc U'; now move the corner of back tack from $18\frac{3}{4}$ to star ★ W' at the same time traverse the mark Y' on the arc U'; put the square on the back seam with the corner at the back tack, run a line by the square and make a ★ Z' where it crosses the line R', S'; move the square to $15\frac{1}{2}$ on back seam and rule a line $H^2$ by the square as before and make a ★ $A^2$ where it crosses R', S'. Then with center S' draw arc $B^2$ through ★ $A^2$, then lay the square on the line X' with the corner at S' and make ★ $C^2$ where the square crosses the arc $B^2$. Now the distance from ★ $C^2$ to $A^2$ is three half inches; measure half an inch each side of ★ $A^2$ and draw lines $D^2$ and $E^2$ from S' also $F^2$ and $G^2$ from Z' to them. To cut the fish from the side piece measure the other half inch from the side back seam on the line $H^2$; hold Y' on U' and vibrate the back to the half in.; mark and rule the line $I^2$; then draw the line $J^2$ from the lower end of back side to the half inch mark. With the distance from $Y^2$ to $U^2$ from Y' draw the arc $K^2$ then with the distance S' $U^2$ draw arc $L^2$; and draw a line by the back from ★ Y' to the intersection of the arcs $K^2$ and $L^2$. From S' with the distance to $e$ draw arc $M^2$ and with the same distance from $M^2$ draw the arc from S' to $e$; and mark the remaining part of the scye in the usual manner.

*To curve the neck.*—Lay one arm of the square on the line $E^3$ on the back Fig. 11, in such a position that the other arm crosses the front scale $\frac{3}{4}$ of an inch below the point A and draw $N^2$ from near A to $E^3$; then put the corner of the square at $O^2$ (the corner formed by the shoulder and back top seams on the back) and mark the line $N^2$ opposite $11\frac{1}{2}$ on the scale to curve the neck making ★ $P^2$ then with the distance from $O^2$ to $P^2$ draw the arc $Q^2$ and with the same from $P^2$ draw $R^2$ and from the intersection of $Q^2$ and $R^2$ draw the arc from $P^2$ to $O^2$. Now draw from $P^2$ to A and add to the width of the breast according to taste or fashion.

*Directions to cut skirt for dress coat,* (Fig. 16.)—Measure the front and side on hip seam which will make $13\frac{1}{2}$ in. draw line $S^2$ measure from the bottom the length of the skirt make ★ $T^2$; lay the square on $S^2$ with corner on $T^2$ and draw $U^2$, hold the corner at $T^2$ and vibrate the square so that 3, on the circular scale will lay over $U^2$ and draw $V^2$. Then turn the square over and with the corner at $T^2$ make ★ $W^2$ on $V^2$ opposite $13\frac{1}{2}$ on dress and frock coat skirt scale, then lay one side of the square on $S^2$ draw $X^2$ through $W^2$. Now with the corner on $W^2$ mark ★ $Z^2$ on $X^2$ opposite $13\frac{1}{2}$ on the scale last mentioned which is the length of the hip seam above mentioned. Around the plate, mark the strap and shape your skirt according to taste or fashion.

*Directions to cut skirt for frock-coat,* (Fig. 17.)—Measure the front and side on hip seam which is $13\frac{1}{2}$ in. draw line $A^3$ allowing for the lappel measure the length of your skirt and make ★ $B^3$, lay the square on $A^3$ and draw $C^3$; hold the corner at $B^3$ and vibrate the square so that 3 on the circular scale will lay over $C^3$ and draw $D^3$, move the circular scale so 2 lays over $C^3$ and draw line $E^3$. Then turn the square over and with the corner on $B^3$ make ★ $F^3$ opposite $13\frac{1}{2}$ on the dress and frock coat skirt scale, move the corner to $F^3$ and mark ★ $G^3$ on $D^3$ opposite $13\frac{1}{2}$ on the scale last mentioned making the line $L^3$. Lay the square on $D^3$ with the corner at $G^3$ and draw $H^3$; hold the corner at $G^3$ and vibrate the square so that 4 on the circular scale lays over $H^3$ and draw $I^3$ and measure the length with the back of the skirt on $I^3$ and shape out your skirt according to taste or fashion.

*Directions to cut the sleeve measure the whole circle of the scye, which is $13\frac{1}{2}$ inches.*—Lay the square to the corner of the cloth and draw $J^3$ and $K^3$ Fig. 18. Now lay the square (as represented in Fig. 4,) traverse $13\frac{1}{2}$ of the 4th sleeve scale on the line $K^3$ until $13\frac{1}{2}$ on the third sleeve scale lays over the line $I^3$, and $13\frac{1}{2}$ on the vibrating sleeve scale (when it is at right angles to the third sleeve scale) lays over $K^3$; then make a ★ opposite $13\frac{1}{2}$ on each of the four sleeve scales run a circular line so as to cut each of the stars and mark the remainder of the sleeve according to measure and fashion.

By my invention a most perfect fit is obtained with mathematical accuracy for if the suit worn by the person from whom the measure is taken does not fit the scales and apparatus applied to him to take his measure press his clothes against his person so that the measure is taken accurately notwithstanding the clothes he has on at the time do not fit him.

I contemplate varying the scales on the square and sector used with this apparatus and this system of measurement; so as to adapt them to delineating and cutting the various garments worn by persons of either sex according to the prevailing fashion or otherwise; and also to make such additional scales on said square and sector as may be useful and convenient for the purposes designed. And further I contemplate marking the scales applied to the body upon both sides; so that by reversing the pivots either side or both sides of the person may be measured if any deformity should make it necessary.

What I claim as my invention and desire to secure by Letters Patent is:

The front, side and back scales, or their equivalents constructed substantially as described, and used in conjunction, for the purpose of taking the measures of persons and cutting garments to fit them, subtantially as described.

In testimony whereof, I have hereunto signed my name before two subscribing witnesses.

MOSSES T. ROWLANDS.

Witnesses:
R. W. WILCOX,
J. DENNIS, Jr.